United States Patent [19]

Caunt et al.

[11] 4,108,796

[45] Aug. 22, 1978

[54] TREATMENT OF TRANSITION METAL COMPOUND

[75] Inventors: Anthony David Caunt, Welwyn Garden City; Michael Stanley Fortuin, Tarporley; Ian Gabriel Williams, Letchworth, all of England

[73] Assignee: Imperial Chemical Industries Limited, London, England

[21] Appl. No.: 627,451

[22] Filed: Oct. 30, 1975

[30] Foreign Application Priority Data

Oct. 30, 1974 [GB] United Kingdom ............... 46966/74

[51] Int. Cl.$^2$ ............................................. B01J 31/02
[52] U.S. Cl. ................................ 252/429 B; 526/119; 526/139; 526/351; 526/906
[58] Field of Search ................................... 252/429 B

[56] References Cited

U.S. PATENT DOCUMENTS

| | | |
|---|---|---|
| 3,046,266 | 7/1962 | Benning et al. ............... 252/429 B X |
| 3,121,063 | 2/1964 | Tornquist ........................ 252/429 C |
| 3,123,572 | 3/1964 | Herman et al. ............... 252/429 B X |
| 3,140,277 | 7/1964 | Coover, Jr. et al. ......... 252/429 B X |
| 3,278,511 | 10/1966 | Langer, Jr. .................. 252/429 B X |
| 3,298,965 | 1/1967 | Tornquist ........................ 252/429 C |
| 3,303,179 | 2/1967 | Jezl et al. ..................... 252/429 B X |
| 3,547,864 | 12/1970 | Lasis ............................ 252/429 B X |
| 3,560,146 | 2/1971 | Luciani et al. ................... 252/429 B |
| 3,701,763 | 10/1972 | Wada et al. .................. 252/429 B X |
| 3,850,899 | 11/1974 | Wada et al. .................. 252/429 B X |
| 3,888,789 | 6/1975 | Dombro et al. ............. 252/429 B X |
| 3,937,691 | 2/1976 | Staiger ......................... 252/429 B X |
| 3,972,866 | 8/1976 | Fortuin et al. ............... 252/429 B X |
| 3,984,350 | 10/1976 | Karayannis et al. ............. 252/429 B |

FOREIGN PATENT DOCUMENTS

| | | |
|---|---|---|
| 2,313,533 | 9/1973 | Fed. Rep. of Germany. |
| 49-53,675 | 8/1975 | Japan. |
| 1,087,314 | 10/1967 | United Kingdom. |

*Primary Examiner*—Delbert E. Gantz
*Assistant Examiner*—William G. Wright
*Attorney, Agent, or Firm*—Cushman, Darby and Cushman

[57] ABSTRACT

A titanium trihalide is ground with an organic Lewis Base compound which contains at least one phosphorus atom, and optionally at least one nitrogen atom, and a titanium tetrahalide, the Lewis Base and the titanium tetrahalide being used in amounts of 5 to 75, preferably 5 to 50%, molar and 1 to 50, preferably 5 to 30% molar respectively relative to the titanium trihalide. The materials are conveniently milled together and the milled product can be used as a component of an olefine polymerization catalyst and when such catalysts are used to polymerize propylene a high activity is achieved together with satisfactory stereospecificity.

17 Claims, No Drawings

TREATMENT OF TRANSITION METAL COMPOUND

The present invention relates to the treatment of compounds of transition metals and to the use of the treated compounds as components of catalysts for the polymerisation of olefine monomers.

According to the present invention a titanium trihalide (component A) is ground in the presence of from 5 up to 75% molar, relative to the titanium trihalide, of an organic Lewis Base compound which contains at least one phosphorus atom (component B) and from 1 up to 50% molar, relative to the titanium trihalide, of a titanium tetrahalide (component C), wherein the amount of the organic Lewis Base is such as to provide at least one functional group (as hereafter defined) for each molecule of the titanium tetrahalide.

We prefer that the titanium trihalide is ground with from 5 up to 50% molar of the organic Lewis Base compound, and from 5 up to 30% molar of the titanium tetrahalide.

The titanium halides are preferably the chlorides. Suitable forms of titanium trichloride are obtained by the reduction of titanium tetrahalide with hydrogen, titanium metal, aluminium metal or an organo-aluminium compound. It is preferred to use the materials of the type, titanium trichloride/aluminium chloride, such as is obtainable by the reduction of titanium tetrachloride with aluminium metal.

Thus, according to a preferred embodiment of the present invention, a titanium trichloride/aluminium trichloride material is ground in the presence of an organic Lewis Base compound which contains at least one phosphorus atom and titanium tetrachloride.

A wide range of organic Lewis Base compounds containing at least one phosphorus atom have been proposed as components of olefine polymerisation catalysts and any of these compounds can be used as component B in the process of the present invention. Thus, organic Lewis Base compounds which can be ground with the transition metal compounds include the organic phosphines, phosphine oxides, phosphites and phosphates such as triphenylphosphine; triphenylphosphine oxide; triethylphosphite and triethylphosphate. The organic Lewis Base compound may also include at least one nitrogen atom and such compounds include hexamethylphosphoric triamide; N,N,N',N'-tetramethylethyl phosphorodiamidate; N,N,N',N',N"-pentamethyl-N"-β-dimethylaminoethylphosphoric triamide; 2-dimethylamino-1,3-dimethyl-1,3,2-diaza-phospholidine-2-oxide and octamethylpyrophosphoramide.

The use of organic Lewis Base compounds of this type in olefine polymerisation catalysts, and grinding of these compounds with transition metal compounds are disclosed, inter alia in British Patent Specification Nos. 803,198; 920,118; 921,954; 1,017,977; 1,208,815; 1,234,657; 1,324,173; and 1,359,328, and published German Patent Application Nos. 2,234,506 and 2,329,723.

Our copending British Patent Application No. 7989/73 describes the use of organo-phosphine oxide derivatives wherein at least one group attached to the phosphorus atom is a heterocyclic group containing more than 3 atoms preferably five or six atoms, in the ring and attached to the phosphorus atom by a carbon or heteroatom. Alternatively our copending British Patent Application No. 7988/73 describes the use of an organic Lewis Base compound which is an organo-phosphine oxide wherein the phosphorus atom is included, together with 3 other heteroatoms, in an endocyclic ring system.

We have obtained particularly useful results using organic Lewis Base compounds which contain both phosphorus and nitrogen atoms.

Thus, according to a further embodiment of the present invention component A is titanium trichloride, particularly a titanium trichloride/aluminium chloride material, component B is an organic Lewis Base compound which contains at least one phosphorus atom and at least one nitrogen atom, and component C is titanium tetrachloride.

In effecting the process of the present invention, particularly useful results are obtained by using components B and C in specified proportions relative to each other. The preferred proportions for any particular combination of components B and C will be dependent on the nature of the two components, especially component B. Component B is used in a quantity to provide at least one functional group for each molecule of titanium tetrahalide used. Thus, if component B contains only one functional group, the molar ratio of component B to component C is preferably at least 1:1. Similarly, if component B contains two functional groups, the preferred molar ratios of component B to component C are at least 0.5:1.

By "functional groups" is meant atoms which are present in the compound and which have at least one pair of free (that is uncombined) electrons by means of which complexing with a titanium or aluminium atom is possible. It should be understood that not all free electron pairs present in the organic Lewis Base compounds which are component B, are capable of complexing with a titanium or aluminium atom.

A convenient way of determining the number of functional groups is to determine the maximum number of moles of titanium tetrahalide, conveniently titanium tetrachloride, which react with one mole of the organic Lewis Base compound by reacting the organic Lewis Base compound with a molar excess of titanium tetrachloride, isolating the complex formed and determining the ratio of titanium tetrachloride to organic Lewis Base compound in the complex. This ratio is a measure of the number of functional groups present in the organic Lewis Base compound.

Thus, organic Lewis Base compounds containing one functional group include hexamethylphosphoric triamide (HMPT), 2-dimethylamino-1,3-dimethyl-1,3,2-diazaphospholidine-2-oxide (DDDPO) and N,N,N',N'-tetramethylethyl phosphorodiamidate (TEPD) whilst compounds containing two functional groups include N,N,N',N',N"-pentamethyl-N"-β-dimethylaminoethylphosphoric triamide (PDEPT) and octamethylpyrophosphoramide (OMPA).

In general we prefer that the organic Lewis Base compound provides more than one functional group for each molecule of the titanium tetrahalide, and in particular that the excess of functional groups is equal to from 10 up to 25% molar of the titanium trihalide with which the organic Lewis Base compound and titanium tetrahalide are ground.

If a mixture of a titanium trichloride containing material, HMPT and titanium tetrachloride are ground together, then, for each mole of titanium trichloride which is present in the titanium trichloride containing material, it is preferred to use from 0.05 up to 0.50 moles of titanium tetrachloride and from 0.05 up to 0.50 moles of HMPT, particularly from 0.05 up to 0.20 moles of titanium tetrachloride and from 0.10 up to 0.40 moles of HMPT, with the number of moles of HMPT being greater than the number of moles of titanium tetrachloride.

If a mixture of a titanium trichloride containing material, DDDPO and titanium tetrachloride are ground together, then, for each mole of titanium trichloride material, it is preferred to use from 0.01 up to 0.50 moles of titanium tetrachloride and from 0.05 up to 0.70 moles of DDDPO, particularly from 0.05 up to 0.30 moles of titanium tetrachloride and from 0.20 up to 0.50 moles of DDDPO, with the number of moles of DDDPO being at least equal to, and preferably greater than, the number of moles of titanium tetrachloride.

If a mixture of a titanium trichloride containing material, PDEPT and titanium tetrachloride are ground together, then, for each mole of titanium trichloride which is present in the titanium trichloride containing material, it is preferred to use from 0.05 up to 0.60 moles of titanium tetrachloride and from 0.05 up to 0.50 moles of PDEPT, particularly from 0.10 up to 0.20 moles of titanium tetrachloride and from 0.05 up to 0.20 moles of PDEPT, with the number of moles of PDEPT being not more than the number of moles of titanium tetrachloride and preferably more than half the number of moles of titanium tetrachloride.

The grinding is conveniently effected using a milling technique and can be effected in a ball mill. The temperature of the milling can be from $-10°$ C (or below) up to 100° C or higher. The optimum milling temperature will be dependent on the components being milled and is preferably in the range from $-10°$ to 50° C. More specifically, if the organic Lewis Base compound is HMPT, the milling temperature is preferably in the range from 10° up to 40° C, if the organic Lewis Base compound is DDDPO, the milling temperature is preferably in the range from 0° up to 30° C, if the organic Lewis Base compound is PDEPT, the milling temperature is preferably in the range from 0° up to 30° C, and if the organic Lewis Base compound is TEPD, the milling temperature is preferably in the range from $-10°$ up to $+10°$ C.

As will be apparent from the discussion of the number of functional groups present in the Lewis Base, complexes can be formed between the organic Lewis Base compound and the titanium tetrahalide. Some Lewis Bases can form more than one complex, for example, with titanium tetrachloride, DDDPO can form the complexes TiCl$_4$.DDDPO (which indicates the presence of one functional group) and TiCl$_4$.2DDDPO. Thus, in carrying out the milling process of the present invention, the compounds to be milled may be introduced separately into the mill, or the Lewis Base and the titanium tetrahalide can be added as a complex thereof or as a complex plus further uncomplexed Lewis Base or titanium tetrahalide. It should be appreciated that all the foregoing variations are within the scope of the present invention. However, in general it is convenient to add the compounds to the mill separately without forming any complexes.

The grinding time will be dependent on the compositions being ground, the grinding temperature and the intensity of the grinding but in general, when using a ball-mill giving a tumbling action, we prefer to mill for at least 5 hours but not more than 100 hours. It will be appreciated that other grinding techniques may be used, for example grinding in a vibrating mill, and using such other techniques, different times and temperatures of grinding may be preferred.

It will be appreciated that the process of the present invention is effected in an inert atmosphere, in the absence of any quantity of such oxygen-containing materials as air, and water vapour, which quantity is sufficient to deleteriously affect the characteristics of the ground product as a component of an olefine polymerisation catalyst. The ground product may be washed with a suitable liquid medium, for example with an inert aliphatic or aromatic hydrocarbon liquid before it is used as a component of an olefine polymerisation catalyst.

The ground products of the present invention are particularly suitable for use as one component of an olefine polymerisation catalyst.

Thus, according to a further aspect of the present invention there is provided an olefine polymerisation catalyst comprising (1) a titanium trihalide component and (2) at least one organo-metallic compound of aluminium or of a non-transition metal of Group IIA of the Periodic System, or a complex of an organo-metallic compound of a non-transition metal of Group IA or IIA of the Periodic System and an organo-aluminium compound; wherein the titanium trihalide component (1) is the product obtained by grinding a titanium trihalide (component A), preferably titanium trichloride, in the presence of from 5 up to 75% molar, preferably from 5 up to 50% molar, relative to the titanium trihalide, of an organic Lewis Base compound which contains at least one phosphorus atom (component B), and preferably containing at least one phosphorus atom and at least one nitrogen atom, and from 1 up to 50% molar, preferably from 5 up to 30% molar, relative to the titanium trihalide, of a titanium tetrahalide (component C), preferably titanium tetrachloride, wherein the amount of component (1) (B) is such as to provide at least one functional group (as hereinbefore defined) for each molecule of the titanium tetrahalide.

Component (1) of the catalyst is a material obtained by the procedure hereinbefore described.

Component (2), the organo-metallic compound, can be a Grignard reagent which is substantially ether free or a compound of the type Mg(C$_6$H$_5$)$_2$. Alternatively component (2) can be a complex of an organo-metallic compound of a non-transition metal of Groups IA or IIA with an organo-aluminium compound, for example Mg[Al(C$_2$H$_5$)$_4$]$_2$ or lithium aluminium tetraalkyl. It is preferred that component (2) is an organo-aluminium compound such as a bis(dialkyl aluminium) oxyalkane, a bis(dialkyl aluminium)oxide, an aluminium hydrocarbyl sulphate, an aluminium hydrocarbyl oxyhydrocarbyl or particularly an aluminium trihydrocarbyl or dihydrocarbyl aluminium halide or hydride, especially aluminium triethyl or diethyl aluminium chloride since catalysts including aluminium triethyl give a high polymerisation rate whilst catalysts including diethyl aluminium chloride give a relatively high percentage yield of the desirable insoluble (isotactic) polymer. A mixture of compounds can be used if desired, for example a mixture of an aluminium trialkyl and an aluminium dialkyl halide. It may be preferred to use catalysts giving a low level of residual halogen in the polymer product in which case component (2) is desirably a halogen-free compound, particularly an aluminium trihydrocarbyl.

In addition to components (1) and (2), the catalyst very preferably contains a further component (component (3)) which is an organo-Lewis Base compound. The Lewis Base which is component (3) of the catalyst can be any Lewis Base which is effective to alter the activity and/or stereospecificity of a Ziegler catalyst system. A wide range of such Lewis Bases have been proposed which have such an effect and these include not only the Lewis Base compounds which can be used as component (1) (B) of the catalyst system but also amines; amides; ureas; ethers; esters; ketones; alcohols; the sulphur containing analogues of the ethers, esters, ketones and alcohols and silicon compounds such as the silanes and siloxanes. Catalyst systems including such Lewis Base compounds or complexes including Lewis Base compounds are disclosed, inter alia, in British Patent Specification Nos. 809,717; 880,998; 933,236; 940,125; 966,025 and 971,248. The term "amine" is used herein to include cyclic and acyclic amines such as triethylamine, tributylamine, pyridine, quinoline and substituted derivatives thereof such as α-picoline; diamines such as tetramethylethylenediamine and amines substituted with other functional groups such as alkanolamines, for example β(N,N-dimethyl amino)ethanol. If the catalyst includes a third component, it is convenient that component (3) of the catalyst is either an organic Lewis Base compound of the same type as is used as component (1) (B) of the catalyst, or an amine. It will be appreciated that the Lewis Base used as component (3) can be different from that used as component (1) (B) of the catalyst. Particularly useful Lewis Bases for use as component (3) of the catalyst include hexamethylphosphoric triamide; 2-dimethylamino-1,3-dimethyl-1,3,2-diazaphospholidine-2-oxide; N,N,N',N',N"-pentamethyl-N"-β-dimethylaminoethyl-phosphoric triamide; octamethylpyrophosphoramide and tetramethylethylenediamine.

In addition to, or instead of, including a Lewis Base compound as component (3) of the catalyst system, there may be present a substituted or unsubstituted polyene (component (4)).

The polyene may be an acyclic polyene such as 3-methylheptatriene (1,4,6) or a cyclic polyene such as cyclooctatriene, cyclooctatetraene or particularly cycloheptatriene or may be a derivative of such cyclic polyenes, for example, the alkyl- or alkoxysubstituted polyenes; tropylium salts or complexes, tropolone or tropone.

The proportions of the catalyst component can vary quite widely depending on the particular materials used and the absolute concentrations of the components. However, in general for each molecular proportion of the titanium trihalide which is component (1) (A) of the catalyst there is present at least 0.05, and preferably at least one molecular proportion of component (2), but it may be desirable to use much greater quantities of component (2), for example as many as 50 molecular proportions, or even more, for each molecular proportion of the titanium trihalide. In general we prefer to use not more than 25, and particularly not more than 10, molecular proportions of component (2) for each molecular proportion of the titanium trihalide. If the catalyst includes further Lewis Base as component (3) of the catalyst, then for each molecular proportion of the titanium trihalide which is present as component (1) (A), there is present from 0.01 up to 10, preferably from 0.1 up to 4 molecular proportions of the Lewis Base which is component (3) and the number of molecular proportions of component (3) is less than the number of molecular proportions of component (2). The molecular proportions of any polyene which is present as component (4) of the catalyst system, plus any Lewis Base compound which is present as component (3) of the catalyst system should preferably, in total, be less than the number of molecular proportions of component (2) which is present in the catalyst For each molecular proportion of component (2), the number of molecular proportions of the polyene is conveniently in the range 0.01 up to 1.0, especially 0.05 up to 0.5, for example from 0.1 up to 0.2. If the catalyst includes both components (3) and (4), these can conveniently be used in equimolar proportions but the relative proportions of these components may be varied to give the optimum results.

A preferred catalyst within the present invention comprises:

(1) a titanium trichloride containing material obtained by milling (A) a titanium trichloride/aluminium trichloride material in the presence of (B) from 5 up to 75% molar, preferably from 5 up to 50% molar, relative to the titanium trichloride, of an organic Lewis Base compound which contains at least one phosphorus atom and at least one nitrogen atom, and (C) from 1 up to 50% molar, preferably from 5 up to 30% molar, relative to the titanium trichloride, of titanium tetrachloride, wherein the amount of the organic Lewis Base is such as to provide at least one functional group (as hereinbefore defined) for each molecule of the titanium tetrachloride;

(2) at least one organo-aluminium compound; and (3) at least one organic Lewis Base compound which contains at least one phosphorus atom, or at least one amine.

The Lewis Base compound which is component (1) (B) is conveniently hexamethylphosphoric triamide; 2-dimethylamino-1,3-dimethyl-1,3,2-diazaphospholidine-2-oxide; N,N,N',N'-tetramethylethyl phosphorodiamidate or N,N,N',N',N"-pentamethyl-N"-β-dimethylaminoethyl-phosphoric triamide.

The organo-aluminium compound is preferably a trialkyl aluminium compound or a dialkyl aluminium halide, for example triethyl aluminium or diethyl aluminium halide or a mixture thereof. If the organo-aluminium compound is a dialkyl aluminium halide, we have found that it is desirable to subject component (1) of the catalyst system to further treatment. Suitable treatments include washing component (1) with an inert hydrocarbon or suspending component (1) in a solution of a material capable of reacting with the TiCl₄ present in component (1), such as diethyl aluminium chloride.

The Lewis Base which is component (3) of the catalyst is conveniently hexamethylphosphoric triamide; 2-dimethylamino-1,3-dimethyl-1,3,2-diazaphospholidine-2-oxide or tetramethylethylenediamine.

The catalysts of the present invention are particularly suitable for the polymerisation and copolymerisation of mono-α-olefines by contacting at least one mono-α-olefine with such a catalyst.

More specifically, there is provided a process for the production of a polymer of a mono-α-olefine wherein at least one mono-α-olefine is contacted with a polymerization catalyst comprising:

(1) a titanium trihalide component obtained by grinding, conveniently milling, a titanium trihalide (component A), in the presence of from 5 up to 75% molar, preferably from 5 up to 50% molar, relative to the titanium trihalide of an organic Lewis Base compound which contains at least one phosphorus atom (component B) and from 1 up to 50% molar, preferably from 5 up to 30% molar, relative to the titanium trihalide, of a titanium tetrahalide (component C), wherein the amount of component (B) is such as to provide at least one functional group (as hereinbefore defined) for each molecule of the titanium tetrahalide; and (2) at least one organo-metallic compound of aluminium, or of a non-transition metal of Group IIA of the Periodic System, or a complex of an organo-metallic compound of a non-transition metal of Group IA or IIA of the Periodic System and an organoaluminium compound; and optionally (3) at least one organic Lewis Base compound; and/or (4) a substituted or unsubstituted polyene.

Any mono-α-olefine monomer which is capable of being polymerised using a Ziegler catalyst may be polymerised by the process of the present invention. Thus monomers which can be polymerised by the present process include butene-1, and 4-methylpentene-1 and particularly propylene. These olefines may be copolymerised together but we prefer to effect copolymerisation with ethylene, conveniently using a sequential polymerisation process such as described in British Pat. Nos. 970,478; 970,479 and 1,014,944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be effected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, it is desirable that the monomers and any diluents which are of commercial purity are subjected to a further purification procedure.

Any suitable purification treatment can be used and the treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British Patent Specification Nos. 1,111,493 and 1,226,659.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, the polymerisation can be effected using any technique suitable for effecting a gas/solid reaction such as a fluidised bed reactor system or a ribbon blender type of reactor.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of the titanium trihalide, which is a solid compound, may be inconvenient, it may be preferred that all of the titanium trihalide component is added, together with some of each of the other catalyst components, to initiate polymerisation and the rest of the other catalyst components are added during the polymerisation. It is desirable that in any mixing of the catalyst components the titanium trihalide is not allowed to come into contact with any organo-Lewis Base compound which is present as component (3) in the absence of the organo-metallic compound which is component (2) of the catalyst.

The polymeriation can be effected in the presence of a chain transfer agent such as hydrogen or a zinc dialkyl, in order to control the molecular weight of the product formed. If hydrogen is used as the chain transfer agent it is conveniently used in an amount of from 0.01 up to 5.0%, particularly from 0.10 up to 2.0% molar relative to the monomer. The amount of chain transfer agent will be dependent on the polymerisation conditions, especially the temperature which is typically in the range from 20° up to 100° C, preferably from 50° up to 80° C.

Using catalysts in accordance with the present invention, particularly catalysts which also include further organic Lewis Base as component (3) of the catalyst, we have been able to polymerise propylene to obtain a high yield, relative to the amount of catalyst used, of a polymer having a high flexural modulus which in some cases may be as high as that of commercially available propylene polymers which have been obtained in a lower yield and from which a catalyst removal step is necessary.

Thus, when using a catalyst containing titanium trichloride, a propylene polymer can be obtained wherein the titanium content of the polymer derived from the residual catalyst in the polymer is not more than about 100 parts per million (ppm), preferably not more than 80 ppm, by weight and the flexural modulus of the polymer is at least 1.00 GN/m$^2$.

The flexural modulus of the polymer is the modulus as measured by the apparatus described in Polymer Age, March 1970, pages 57 and 58 at 1% skin strain after 60 seconds at 23° C and 50% relative humidity using test samples prepared as in Examples 88 and 89.

The titanium content of the polymer may be determined by any suitable analytical technique and we have found X-ray fluorescence spectrometry to be a particularly convenient technique of analysis.

In general, polymers obtained by the process of the present invention, particularly propylene homopolymers, when formed into test strips, have a flexural modulus in excess of 1.10 GN/m², usually at least 1.15 GN/m². Preferred polymers have a flexural modulus of at least 1.20 GN/m² and the flexural modulus may be as high as 1.35 GN/m². Thus propylene homopolymers having a flexural modulus in the range from 1.00 up to 1.45 GN/m² can be prepared by the process of the present invention.

Propylene polymer can be obtained by the present invention, which are the direct product of polymerisation and are obtained without subjecting the polymer to any treatment to remove either catalyst residue or undesirable polymeric materials such as atactic polymers, polymers of low crystallinity or crystalline polymers of low molecular weight, from the polymerisation product. Whilst the polymers can be obtained without an extraction process, the flexural modulus can be increased by extraction with a suitable solvent, for example heptane.

Polymers can be obtained which have a high molecular weight as indicated by the melt flow index measured according to ASTM Test Method D 1238–70, using Condition N (that is a temperature of 190° C and a weight of 10 kgm). Thus, the polymers have a melt flow index of less than 200, preferably less than 100, particularly less than 50, for example between 5 and 50.

Various aspects of the present invention will now be described with reference to the following Examples which are illustrative of the invention.

EXAMPLE 1

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed, evacuated to 0.2 mm of mercury, and purged with nitrogen, the evacuation and purging being carried out a total of six times to give a nitrogen atmosphere in the mill. About 20 gm of titanium trichloride (Stauffer-AA) were introduced as a solid into the mill, followed immediately by 10% molar (based on the TiCl$_3$ content of the Stauffer-AA) of titanium tetrachloride and 30% molar (also relative to the TiCl$_3$ content of the Stauffer-AA) of hexamethylphosphoric triamide. The hexamethylphosphoric triamide was introduced into the mill from a syringe. When all the additives had been introduced into the mill it was rotated at 120 rpm for 64 hours. No heating or cooling was applied to the mill.

After milling for 64 hours, rotation of the mill was stopped and the titanium trichloride product was suspended in an inert hydrocarbon diluent and readily removed from the mill.

EXAMPLES 2 TO 27

A further series of millings were carried out using the same general technique as described for Example 1. Details of all the millings (including Example 1) are set out in Table 1 together with some comparative runs (identified by letters) in which the titanium trichloride was milled alone, or with titanium tetrachloride only, or Lewis Base only.

TABLE 1

| Ex. No. (a) | Mole % TiCl$_4$ (b) | Lewis Base Type (c) | Lewis Base Mole % (b) | Milling time (hrs) (d) |
|---|---|---|---|---|
| 1 | 10 | HMPT | 30 | 64 |
| 2 | 10 | HMPT | 20 | 24** |
| 3* | 10 | HMPT | 30 | 64** |
| 4* | 10 | HMPT | 30 | 64 |
| 5* | 10 | HMPT | 30 | 16+24 |
| 6 | 10 | HMPT | 35 | 64 |
| 7 | 10 | HMPT | 35 | 88 |
| 8 | 10 | HMPT | 40 | 88 |
| 9 | 10 | HMPT | 40 | 64 |
| 10 | 20 | HMPT | 35 | 64 |
| 11 | 20 | HMPT | 40 | 64 |
| 12 | 20 | HMPT | 40 | 112 |
| 13 | 10 | HMPT | 60 | 64 |
| 14 | 20 | HMPT | 60 | 64 |
| 15 | 25 | HMPT | 60 | 64 |
| 16 | 5 | DDDPO | 20 | 16+24*** |
| 17 | 10 | DDDPO | 25 | 16+24 |
| 18 | 10 | DDDPO | 30 | 16+24 |
| 19 | 15 | DDDPO | 30 | 16+24*** |
| 20 | 15 | DDDPO | 35 | 16+24 |
| 21 | 20 | DDDPO | 35 | 16+24 |
| 22 | 20 | DDDPO | 40 | 16+24 |
| 23 | 25 | DDDPO | 40 | 16+24 |
| 24 | 10 | PDEPT | 10 | 16+24 |
| 25 | 10 | PDEPT | 15 | 16+24 |
| 26 | 15 | PDEPT | 10 | 16+24 |
| 27 | 15 | PDEPT | 15 | 16+24 |
| A | 0 | — | 0 | 64** |
| B | 0 | — | 0 | 112** |
| C* | 0 | — | 0 | 64 |
| D | 0 | — | 0 | 64 |
| E | 0 | HMPT | 10 | 64** |
| F | 0 | HMPT | 20 | 64 |
| G | 0 | HMPT | 30 | 64 |
| H | 0 | HMPT | 50 | 64 |
| J | 10 | — | 0 | 24** |
| K | 0 | DDDPO | 11 | 24 |
| L | 0 | DDDPO | 30 | 24 |
| M | 0 | DDDPO | 40 | 24 |
| N | 0 | PDEPT | 8.4 | 24 |
| P | 0 | PDEPT | 11.0 | 24 |
| Q | 0 | PDEPT | 16.7 | 24 |

Notes to Table 1
(a) In the Examples marked with an asterisk (*), milling was effected using only 200 balls of 12.7 mm diameter.
(b) Moles % based on TiCl$_3$ present in Stauffer-AA.
(c) HMPT is hexamethylphosphoric triamide. DDDPO is 2-dimethylamino-1,3-dimethyl-1,3,2-diazaphospholidine-2-oxide. PDEPT is N,N,N',N',N''-pentamethyl-N''-β-dimethylaminoethylphosphoric triamide.
(d) The sum of two times indicates that Stauffer-AA was milled with TiCl$_4$ for the first period and the Lewis Base was added for the second period. In the Examples marked , the milling was carried out with the mill in a closed box and the air temperature in the box at the end of the milling was 38° C. In the Examples marked *, water at 20° C was sprayed onto the outside of the mill.

EXAMPLES 28 to 57

The titanium trichloride products of Examples 1 to 27 and the Comparative Examples were used to polymerise propylene.

The propylene used for the polymerisation had been purified by passing gaseous propylene in turn through a column (3 inches diameter, 3 feet length) containing 1/16 inch granules of Alcoa F1 alumina at 50°–60° C, and then through a similar column containing BTS catalyst (Cupric oxide reduced to finely divided metallic copper on a magnesium oxide support) at 40°–50° C, condensing the issue gas and passing the liquid propylene through four columns (all 3 inches diameter; two of 3 feet in length, two of 6 feet in length) at 25° C, each containing 1/16 inch pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methylacetylene etc.) was unchanged at <1 ppm.

A polymerisation flask equipped with efficient stirrer and a water jacket was dried carefully and 1 liter of an inert hydrocarbon diluent having a boiling range of about 170°–175° C was introduced. The diluent was evacuated at 60° C purged with nitrogen and evacuated which treatment effectively reduced the water and oxygen contents of the diluent to below 10 ppm by weight. The diluent was then saturated with the purified propylene to one atmosphere pressure. Eight millimoles of triethyl-aluminium were introduced followed by four millimoles of hexamethylphosphoric triamide. After half hour 2 millimoles of TiCl$_3$ obtained as described in the preceding Examples were introduced. The pressure in the reaction vessel was maintained at one atmosphere by supply of propylene from a burette. After a period of 2.5 hours from the introduction of the TiCl$_3$ the run was terminated with 10 ml of isopropanol and a sample of supernatant liquid extracted for determining the concentration of soluble polymer dissolved in the polymerisation diluent. The solid was filtered and washed three times with petrol ether and dried in a vacuum oven at 120° C for an hour. The yield of solid plus calculated soluble polymer equalled within experimental error the propylene loss from the burette.

The results obtained are set out in Table 2, comparative examples being indicated by letters.

TABLE 2

| Example No. (f) | Type of TiCl$_3$ (g) | Yield of Solid Polymer (g/mMol) (h) | % Wt of Soluble Polymer (i) |
|---|---|---|---|
| 28 | 1 | 41.9 | 3.0 |
| 29 | 2 | 35.8 | 5.6 |
| 30 | 3 | 51.6 | 3.6 |
| 31* | 3 | 43.3 | 3.0 |
| 32 | 4 | 53.6 | 1.9 |
| 33 | 5 | 43.7 | 1.9 |
| 34** | 5 | 67.6 | 1.6 |
| 35*** | 5 | 48.3 | 2.9 |
| 36 | 6 | 53.3 | 2.8 |
| 37 | 7 | 38.5 | 2.3 |
| 38 | 8 | 37.7 | 2.4 |
| 39 | 9 | 26.4 | 3.3 |
| 40 | 10 | 26.8 | 3.5 |
| 41 | 11 | 38.5 | 1.7 |
| 42 | 12 | 38.9 | 2.5 |
| 43 | 13 | 38.6 | 1.7 |
| 44 | 14 | 7.3 | 4.1 |
| 45 | 15 | 15.8 | 5.1 |
| 46 | 16 | 51.6 | 3.1 |
| 47 | 17 | 67.1 | 2.4 |
| 48 | 18 | 55.6 | 1.9 |
| 49 | 19 | 57.2 | 1.9 |
| 50 | 20 | 51.2 | 3.0 |
| 51 | 21 | 57.6 | 2.7 |
| 52 | 22 | 50.4 | 2.3 |
| 53 | 23 | 26.5 | 2.9 |
| 54 | 24 | 56.2 | 3.6 |
| 55 | 25 | 26.2 | 4.9 |
| 56 | 26 | 59.8 | 3.1 |
| 57 | 27 | 51.5 | 2.9 |
| R | A | 26.1 | 11.8 |
| S | B | 33.7 | 9.0 |
| T | C | 34.0 | 10.1 |
| U | D | 33.4 | 9.9 |
| V | E | 47.1 | 6.2 |
| W | F | 44.7 | 4.0 |
| X | G | 23.4 | 5.1 |
| Y | H | 8.8 | 4.6 |
| Z | J | 46.7 | 7.0 |
| AA | K | 33.7 | 9.0 |
| AB | L | 31.5 | 4.7 |
| AC | M | 23.0 | 5.6 |
| AD | N | 29.6 | 8.4 |
| AE | P | 17.4 | 10.2 |
| AF | Q | 8.9 | 9.7 |

Notes to Table 2
(f) *In this polymerisation, HMPT was replaced by 4 mMol DDDPO.
**This polymerisation was effected for a time of 5 hours.
***In this polymerisation the HMPT was omitted.
(g) The number or letter refers to the Example or Comparative Example describing the milling of the TiCl$_3$ component.
(h) Based on solid polymer only relative to the TiCl$_3$ content of the catalyst.
(i) % based on total polymer (solid + soluble) formed.

EXAMPLES 58 TO 70

The procedure of Examples 28 to 57 was repeated, except that the hexamethylphosphoric triamide was replaced by other Lewis Base compounds. The polymerisation details and results obtained are set out in Table 3.

TABLE 3

| Ex. No. | Type of TiCl$_3$ (g) | Lewis Base Type (j) | Lewis Base Amount (mMol) | Yield of Solid Polymer (g/mMol) (h) | % Wt of Soluble Polymer (i) |
|---|---|---|---|---|---|
| 58 | 17 | DDDPO | 4 | 54.3 | 2.0 |
| 59 | 18 | DDDPO | 4 | 52.8 | 1.7 |
| 60 | 19 | DDDPO | 4 | 54.1 | 1.5 |
| 61 | 20 | DDDPO | 4 | 45.0 | 2.3 |
| 62 | 21 | DDDPO | 4 | 49.1 | 2.3 |
| 63 | 22 | DDDPO | 4 | 42.9 | 2.1 |
| 64 | 18 | TMED CHT | 1 1 | 33.5 | 0.8 |
| 65 | 21 | TMED CHT | 1 1 | 32.3 | 1.3 |
| 66 | 22 | TMED CHT | 1 1 | 24.3 | 1.1 |
| 67 | 26 | TMED CHT | 1 1 | 33.9 | 1.4 |
| 68 | 27 | TMED CHT | 1 1 | 31.3 | 1.6 |
| 69 | 17 | TMED | 2.5 | 37.1 | 0.9 |
| 70 | 20 | TMED | 2.5 | 27.3 | 0.8 |

Notes to Table 3
(g), (h) and (i), as in Notes to Table 2.
(j) DDDPO is as defined in Note (c) to Table 1. TMED is tetramethylethylenediamine. CHT is cycloheptatriene.

EXAMPLES 71 TO 81

The milling procedure of Example 1 was repeated except that in all cases the Stauffer-AA was milled initially with TiCl$_4$ for 16 hours, and the Lewis Base was added and milling was continued for a further 24 hours. In all cases the temperature was controlled by continuously spraying water at a known temperature, attained by means of a heating or cooling bath, over the mill.

The milled products were then used to polymerise propylene using the conditions of Examples 28 to 57 with the exception that DDDPO was used in place of hexamethylphosphoric triamide. The results are given in Table 4.

TABLE 4

| Example No. | Milling Conditions Amount TiCl$_4$ (mMol) | Lewis Base Type (k) | Lewis Base Amount (mMol) | Cooling Water Temp (°C) | Polymerisation Results Yield of Solid Polymer (g/mMol) (h) | % Wt of Soluble Polymer (i) |
|---|---|---|---|---|---|---|
| 71 | 10 | DDDPO | 30 | 2 | 47.1 | 3.3 |

TABLE 4-continued

| Example No. | Milling Conditions | | | | Polymerisation Results | |
|---|---|---|---|---|---|---|
| | Amount TiCl$_4$ (mMol) | Lewis Base Type (k) | Lewis Base Amount (mMol) | Cooling Water Temp (° C) | Yield of Solid Polymer (g/mMol) (h) | % Wt of Soluble Polymer (i) |
| 72 | 10 | DDDPO | 30 | 20 | 54.5 | 2.1 |
| 73 | 10 | DDDPO | 30 | 40 | 43.1 | 2.6 |
| 74 | 15 | DDDPO | 30 | 2 | 62.5 | 2.3 |
| 75 | 15 | DDDPO | 30 | 10 | 59.4 | 1.9 |
| 60 | 15 | DDDPO | 30 | 20 | 54.1 | 1.5 |
| 76 | 15 | DDDPO | 30 | 30 | 54.2 | 2.2 |
| 77 | 15 | DDDPO | 30 | 40 | 41.1 | 1.8 |
| 78 | 20 | DDDPO | 40 | 2 | 38.2 | 2.7 |
| 79 | 20 | DDDPO | 40 | 40 | 26.8 | 2.8 |
| 80 | 10 | TEPD | 25 | 2 | 71.7 | 4.3 |
| 81 | 10 | TEPD | 30 | 2 | 58.9 | 2.3 |
| AG | 0 | TEPD | 15 | 2 | 26.0 | 6.5 |

Notes to Table 4
(h) and (i), as in Notes to Table 2.
(k) DDDPO is as defined in Note (c) to Table 1. TEPD is N,N,N',N'-tetramethylethyl phosphorodiamidate.

EXAMPLES 82 TO 87

A series of polymerisations were carried out using titanium trichloride materials as milled and after washing with toluene.

The washing procedure was effected by allowing a slurry, containing about 50 mMol of the titanium trichloride, to settle. The supernatant liquid was removed by decantation. The solid was re-suspended, at room temperature, in 100 ml of toluene, which had been dried with sodium and nitrogen-purged. The mixture was stirred for 15 minutes, allowed to settle and the supernatant liquid was decanted off. This procedure with toluene was repeated five more times and then was carried out three times with 100 ml of the hydrocarbon diluent used in the preceding examples. The solid was finally suspended in 200 ml of the hydrocarbon diluent.

Polymerisation was carried out for a period of three hours using the procedure as broadly described in Examples 28 to 57. The propylene used contained 0.12% molar of hydrogen relative to the propylene. The catalyst system was 10 millimoles of diethyl aluminium chloride, 0.75 millimoles of hexamethylphosphoric triamide and 2 millimoles of a titanium trichloride material. Further details, and the results obtained, are set out in Table 5.

TABLE 5

| Example No. | TiCl$_3$ Type (g) (l) | Washed | Yield of Solid Polymer (g/mMol) (h) | % Wt of Soluble Polymer (i) |
|---|---|---|---|---|
| 82 | 17 | No | 18.3 | 0.5 |
| 83 | 17 | Yes | 20.8 | 0.6 |
| 84 | 18 | No | 10.6 | 0.4 |
| 85 | 18 | Yes | 16.0 | 0.5 |
| 86 | 81 | No | 15.2 | 0.9 |
| 87 | 81 | Yes | 20.2 | 0.8 |

Notes to Table 5
(g), (h) and (i), as in Notes to Table 2.
(l) 81 refers to the form of TiCl$_3$ used in the polymerisation process of Example 81.

EXAMPLES 88 AND 89

TiCl$_3$ (Stauffer-AA) was milled with titanium tetrachloride (10% molar relative to TiCl$_3$) and DDDPO (25% molar relative to TiCl$_3$) using the procedure of Example 1, except that the TiCl$_3$ was milled initially with TiCl$_4$ for 16 hours and the DDDPO was added and milling was continued for a further 24 hours. The solid was suspended in hydrocarbon diluent and removed from the mill. A sample of the suspension containing 90 millimoles of TiCl$_3$ was washed with toluene and then hydrocarbon diluent as described in Examples 82 to 87, using 150 ml of liquid for each washing stage and then suspending the solid in 300 ml of the diluent.

The washed titanium trichloride material was then used as a component of a polymerisation catalyst to polymerise propylene.

Polymerisation was carried out in a stainless steel autoclave, of total capacity 8 liters, which was fitted with a water-circulation jacket and a vertical anchor stirrer. The autoclave was heated to 70° C, evacuated, and the vacuum was released with propylene (purified as in Examples 28 to 57 ). The autoclave was then evacuated again and the procedure repeated 5 times and the autoclave was finally brought to a pressure of 2 psi gauge with propylene gas at 25° C. A heptane solution containing 50 gram millimoles of diethyl aluminium chloride was added to the autoclave, followed by hexamethylphosphoric triamide and the washed titanium trichloride material, the preparation of which is described above. 5 liters of liquid propylene were added to the autoclave immediately after the addition of the titanium trichloride, the stirrer being operated at 150 rpm. This propylene addition was effected by allowing 5.5 liters of liquid propylene to transfer from a burette at 50° C to the autoclave. Hydrogen (250 gram millimoles) was added and the temperature of the autoclave contents was raised to 65° C over 10 minutes. The hydrogen was commercially available hydrogen (99.99% pure) which had been further purified by passing through a column (8 inches by 4 feet in length) containing a molecular sieve material (Union Carbide 3A) at 20° C. The hydrogen was stored in the sieve column and drawn off as required. Polymerisation was allowed to proceed at a temperature of 65° C and a pressure of 435 psi gauge. More hydrogen (45 gram millimoles on each occasion) was added every 30 minutes. After polymerisation for 4 hours, the autoclave was vented over a period of 10 minutes to remove unpolymerised propylene, and a free-flowing, grey powder was obtained. The proportions of hexamethylphosphoric triamide and titanium trichloride are set out in Table 6, together with the polymerisation results obtained.

TABLE 6

| Ex. No. | Amount TiCl$_3$ (mMol) | Amount HMPT (mMol) | Yield of Solid Polymer (g/mMol) (h) | % Wt of Xylene Soluble Polymer (m) | Flex Mod (GNm$^{-2}$) (n) |
|---|---|---|---|---|---|
| 88 | 2 | 1 | 662 | 3.9 | 1.44 |
| 89 | 1 | 0.5 | 835 | 5.1 | 1.31 |

Notes to Table 6
(h) as in Notes to Table 2.
(m) The proportion of xylene soluble polymer was determined by adding 1 gram of solid polymer to 50 ml of xylene and heating the mixture to the boiling temperature under reflux conditions and maintaining this temperature until the polymer had fully dissolved. The solution was cooled to 20° C and maintained at this temperature, with stirring, for 18 hours. The precipitated polymer was separated by filtration at 20° C, and the proportion of polymer which remained dissolved in the xylene determined by evaporating the solution to dryness.
(n) The flexural modulus was measured using a cantilever beam apparatus as described in Polymer Age, March 1970, pages 57 and 58. The deformation of a test strip at 1% skin strain after 60 seconds at 23° C and 50% relative humidity was measured. The test strip had dimensions of approximately 150 × 19 × 1.6 mm and was prepared as follows: 23 g of the polymer was mixed with 0.1% by weight of an antioxidant ('Topanol' CA), and the mixture was added to a Brabender Plasticizer, at 190° C, 30 rpm and under a load of 10 kg to convert it to a crepe. The crepe was placed within a template, between aluminium foil, and pressed by means of an electric Tangye Press at a temperature of 250° C. The pressing was pre-heated for a period of six minutes, under just enough pressure to make the polymer flow across the template, that is an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C, and after 2 hours at this temperature the heat was switched off and the oven cooled to ambient temperature at 15° C per hour

EXAMPLES 90 to 92

The procedure of Examples 88 and 89 was repeated using different forms of titanium trichloride, a different organo-aluminium compound, a different Lewis Base and different quantities of hydrogen. A solution of aluminium triethyl (8 gram millimoles) in n-heptane was mixed with 0.8 gram millimoles of tetramethylethylenediamine and 0.8 gram millimoles of 1,3,5-cycloheptatriene, and the mixture was injected into the autoclave, followed by a suspension containing 1 gram millimole of a titanium trichloride containing material. 200 gram millimoles of hydrogen were added initially, and additional quantities (20 gram millimoles) of hydrogen were added 10, 25, 45, 80 and 120 minutes from the time of the first hydrogen addition. Polymerisation was terminated after 2.5 hours.

Further details regarding the form of titanium trichloride used, and the polymerisation results obtained, are given in Table 7.

TABLE 7

| Ex. No. | Type of TiCl$_3$ (g)(p) | Yield of Solid Polymer (g/mMol) (h) | Ti (ppm by wt) (q) | MFI (r) | % Wt Residual Solubles (s) | Flex Mod (GNm$^{-2}$) (n) |
|---|---|---|---|---|---|---|
| 90 | 5 | 600 | 87 | 18.0 | 6.9 | 1.36 |
| 91 | 26 | 570 | 100 | 20 | 6.4 | 1.33 |
| 92 | 92 | 450 | 139 | 22 | 6.1 | 1.23 |

Notes to Table 7
(g) and (h), as in Notes to Table 2.
(n) as in Notes to Table 6.
(p) Catalyst 92 is similar to catalyst 18, but all the components were added to the mill initially and milling was effected for 64 hours.
(q) Ti contents were determined experimentally by X-ray fluorescence spectrometry. The incident X-rays were obtained from a chrome anode. The net intensity ratios of the Ti$_{K\alpha}$ lines were compared with those obtained from samples which had also been chemically analysed. The precision of analysis is ± 1 ppm for Ti.
(r) The melt flow index was measured by ASTM Test Method D 1238-70, Condition N (190° C and 10 kg).
(s) Determined in a similar manner to xylene solubles (note (m) to Table 6) except that the liquid was the hydrocarbon diluent described in Examples 28 to 57, the mixture was heated to 185° C and thereafter cooled, and filtered, at 60° C.

EXAMPLES 93 AND 94

The titanium trichloride material described in Examples 88 and 89 was used to polymerise propylene in the gas phase. Polymerisation was carried out in a steel autoclave of capacity 8 liters fitted with an anchor stirrer/scraper. 400 g of dry polypropylene was added while stirring the autoclave at 70° C. The stirrer speed was 150 rpm. The autoclave was evacuated, after half an hour the vacuum was released with propylene, and then the autoclave was re-evacuated. This procedure was repeated a further five times over an hour and a half to leave an atmosphere of propylene. The stirrer was stopped and 50 gram millimoles of diethyl aluminium chloride in heptane were added. The autoclave contents were stirred for a minute, then hexamethylphosphoric triamide was added with the stirrer stopped. The autoclave was stirred for a further minute and 2 gram millimoles of the titanium trichloride material were added. The stirrer was restarted and propylene gas was then admitted to the top of the autoclave from a heated stock vessel containing liquid propylene. A pressure of 400 psi gauge was established over a period of about 30 minutes. The temperature was maintained at 70° C throughout. Hydrogen was added evenly during the pressurisation stage at a rate of 20 mM per 100 psig pressure rise. Polymerisation was effected at 400 psig and 70° C, and hydrogen was added in aliquots of 10 mM for every 80 g of liquid propylene evaporated into the autoclave from the stock vessel. After 4 hours polymerisation the propylene supply was switched off, and the autoclave vented to atmospheric pressure. The gas cap was purged with nitrogen and the polymer emptied out. The polymer obtained was a free flowing greyish powder. The polymer initially present in the reactor had the following characteristics:

Ti content: 75 ppm
MFI: 26
Flex Mod: 1.36 GNm$^{-2}$

Further details and the results obtained are set out in Table 8.

TABLE 8

| Ex. No. | Amount HMPT (mMol) | Yield of Solid Polymer (g/mMol) (h) | % Wt of Xylene Soluble Polymer (m) | Flex Mod (GNm$^{-2}$) (n) |
|---|---|---|---|---|
| 93 | 1.0 | 725 | ND | 1.27 |
| 94 | 0.5 | 788 | 5.1 | 1.30 |

Notes to Table 8
ND means not determined.
(h) as in Notes to Table 2.
(m) and (n), as in Notes to Table 6.

EXAMPLES 95 TO 98

The titanium trichloride material of Example 72 was used to polymerise propylene using the polymerisation procedure of Examples 82 to 87.

The titanium trichloride was used either as obtained from the mill or after contacting with diethyl aluminium chloride (DEAC). Details of the contacting, and the polymerisation results, are given in Table 9.

TABLE 9

| Ex. No. (t) | TiCl$_3$ treatment with DEAC Time (hours) | TiCl$_3$ treatment with DEAC Temp (° C) | Polymerisation results Yield of Solid Polymer (g/mMol) (h) | Polymerisation results % Wt of Soluble Polymer (i) |
|---|---|---|---|---|
| 95* | NIL | — | 11.5 | 1.00 |
| 96** | 20 | 20 | 21.5 | 0.5 |
| 97*** | 0.5 | 60 | 15.1 | 0.5 |
| 98** | 17 | 60 | 20.3 | 0.55 |

Notes to Table 9
(h) and (i), as in Notes to Table 2.
(t) *Procedure was exactly as described in Examples 82 to 87.
**2 gram millimoles of TiCl$_3$ and 10 gram millimoles of diethyl aluminium chloride were mixed together in a dropping funnel at concentrations of 133 mMol/liter and 666 mMol/liter respectively.
*As in  except the concentrations were 2 mMol/liter and 10 mMol/liter respectively.

In Examples 96 to 98, after the contacting had been completed, the contents of the dropping funnel were run into the polymerisation vessel which contained the polymerisation diluent, propylene (and hydrogen) and 0.75 gram millimole of hexamethylphosphoric triamide.

Complexes of titanium tetrachloride with Lewis Bases were prepared as described hereinafter.

Preparation of TiCl$_4$.DDDPO Complex

A one liter flask fitted with a glass sinter backed by a Rotaflow tap was provided with a stirrer and a dropping funnel. The flask was evacuated, then purged with pure nitrogen and 200 ml of dry, nitrogen-purged heptane and 40.25 cm$^3$ (250 mMol) of DDDPO were charged with the Rotaflow tap closed. The tap funnel contained 20 cm$^3$ heptane and 27.4 cm$^3$ (250 mMol) of titanium tetrachloride and this solution was added slowly to the contents of the flask whilst stirring and keeping the temperature below 30° C. An orange-red precipitate formed and was filtered. The solid was then washed twice with heptane and twice with hexane under nitrogen and dried in a stream of nitrogen. The solid was analysed for titanium and nitrogen and the analysis indicated that the complex was TiCl$_4$.DDDPO.

Preparation of a Complex of Empirical Formula TiCl$_4$.8DDDPO

Molar solutions of titanium tetrachloride and DDDPO were made up separately in purified heptane under nitrogen. A 250 cm$^3$ flask was fitted with a rubber Suba seal serum cap and a glass sinter, the exit of which was stoppered with a rubber bung. The flask was evacuated, purged with pure nitrogen are weighed. 15 cm$^3$ of the titanium tetrachloride solution were added using a syringe followed by 30 cm$^3$ of DDDPO. The contents of the flask were shaken and a red-brown solid was deposited. The solid was washed three times with pentane and dried in vacuo. During the washing a very little of the complex dissolved in the wash liquors. The yield was 7.68 grams. On analysis the atomic ratio of phosphorus to titanium was found to be 1.8. It is believed that some DDDPO was removed from the complex on washing and the solid product is a mixture of the complexes TiCl$_4$.2DDDPO and TiCl$_4$.DDDPO in proportions giving empirical formula of TiCl$_4$.1.8DDDPO.

Preparation of TiCl$_4$.OMPA

One gram molecule of octamethylpyrophosphoramide (OMPA) and 250 ml of benzene were charged into a one liter, three necked, flask, fitted with stirrer, condenser, thermometer, nitrogen inlet, and dropping funnel.

One gram molecule of titanium tetrachloride was gradually added, via the dropping funnel, at a rate to maintain the temperature of the flask contents between 25° and 30° C.

When all the titanium tetrachloride had been added, a further 500 ml of benzene were added to make the pale yellow solid formed more mobile. The solid was filtered off under nitrogen, washed with n-heptane and dried under vacuum.

A sample was sent for elemental analysis, after drying overnight in vacuo at 60° C.

Elemental analysis was consistent with the formation of a complex TiCl$_4$.OMPA.

EXAMPLES 99 TO 103

The procedure of Example 1 was repeated with the exception that the complexes of TiCl$_4$ and DDDPO, and TiCl$_4$ and OMPA, and optionally additional DDDPO, were loaded into the mills, followed by about 20 grams of Stauffer-AA. The mills were rotated at 120 rpm for the times stated in Table 10, at room temperature (20° C) without external heating or cooling. Further details of the milling procedure are given in Table 10.

TABLE 10

| Example No. | Complex Type | Mole % Complex added to mill | Mole % extra DDDPO | Milling Time (hours) |
|---|---|---|---|---|
| 99 | TiCl$_4$.DDDPO | 15 | NIL | 64 |
| 100 | TiCl$_4$.DDDPO | 30 | NIL | 64 |
| 101 | TiCl$_4$.DDDPO | 15 | 15 | 40 |
| 102 | TiCl$_4$.2DDDPO | 15 | NIL | 24 |
| 103 | TiCl$_4$.OMPA | 11 | NIL | 24 |

EXAMPLES 104 TO 112

The procedure of Examples 28 to 57 was repeated using the materials of Examples 99 to 103. The results obtained are given in Table 11.

TABLE 11

| Example No. (u) | Type of TiCl$_3$ (v) | Yield of Solid Polymer (g/mMol) (h) | % Wt of Soluble Polymer (i) |
|---|---|---|---|
| 104 | 99 | 14.6 | 6.9 |
| 105 | 100 | 18.8 | 3.4 |
| 106 | 101 | 55.3 | 2.2 |
| 107* | 101 | 50.5 | 2.0 |
| 108** | 101 | 26.7 | 0.8 |
| 109 | 102 | 65.1 | 3.5 |
| 110* | 102 | 61.7 | 2.8 |
| 111*** | 102 | 21.5 | 2.7 |
| 112 | 103 | 45.3 | 5.8 |

Notes to Table 11
(h) and (i), as in Notes to Table 2.
(u) *In this polymerisation, HMPT was replaced by 4 mMol DDDPO.
**In this polymerisation, HMPT was replaced by one mMol tetramethylethylenediamine and one mMol 1,3,5-cycloheptatriene.
***In this polymerisation HMPT was replaced by 3 mMol tetramethylethylenediamine.
(v) Catalysts as indicated in Table 10.

EXAMPLES 113 AND 114

The procedure of Example 1 was repeated using 6.5 grams of triphenylphosphine oxide (23.4 mole%), 0.9 cm$^3$ of titanium tetrachloride (8.2 mole %) and 20 grams of titanium trichloride (Stauffer AA). The triphenylphosphine oxide was added as a solid to the mill after the TiCl$_3$ and before the TiCl$_4$. Milling was effected for 60 hours and the mill was held at 20° C during milling by directing a stream of thermostatically controlled water over it.

Polymerisations were carried out using the procedure as broadly described in Examples 28 to 57. Further details and results are presented in Table 12. 2 mmol of the milled TiCl₃ product were used in each case.

TABLE 12

| Ex. No. | Organo-Al compound Type (w) | Amount | HMPT (mMol) | Time of polymerisation (hours) | Yield of Solid (g/mMol) TiCl₃) (h) | % weight of Soluble Polymer (i) |
|---|---|---|---|---|---|---|
| 113 | TEA | 8 | 4 | 2½ | 61.4 | 4.4 |
| 114 | DEAC | 5 | NIL | 5 | 14.3 | 1.4 |

Notes to Table 12
(h) and (i) as in Notes to Table 2
(w) TEA is triethyl aluminium
DEAC is diethyl aluminium chloride

We claim:

1. A process for the treatment of a compound of a transition metal which comprises grinding a titanium trihalide in the presence of from 5 up to 75% molar, relative to the titanium trihalide, of an organic Lewis Base compound which is an organo-phosphorus compound selected from the group consisting of hexamethylphosphoric triamide, N,N,N', N'-tetramethylethyl phosphorodiamidate; N,N,N', N', N''-pentamethyl-N''-β-dimethylamino-ethylphosphoric triamide; 2-dimethylamino-1,3-dimethyl-1,3,2-diazaphospholidine-2-oxide octamethylpyrophosphoramide, hydrocarbyl phosphines, hydrocarbyl phosphine oxides, hydrocarbyl phosphites, and hydrocarbyl phosphates and from 1 up to 50% molar, relative to the titanium trihalide, of a titanium tetrahalide, wherein the amount of the organic Lewis Base is such as to provide at least one functional group for each molecule of the titanium tetrahalide.

2. The process of claim 1 in which from 5 up to 50% molar of the organic Lewis Base compound is ground with the titanium trihalide and titanium tetrahalide.

3. The process of claim 1 in which from 5 up to 30% molar of the titanium tetrahalide is ground with the titanium trihalide and organic Lewis Base compound.

4. The process of claim 1 in which the organic Lewis Base compound is selected from the group consisting of hexamethylphosphoric triamide, N,N,N',N'-tetramethylethyl phosphorodiamidate; N,N,N',N',N''-pentamethyl-N''-β-dimethylamino-ethylphosphoric triamide; 2-dimethylamino-1,3-dimethyl-1,3,2-diazaphospholidine-2-oxide octamethylpyrophosphoramide and triphenylphosphine oxide.

5. The process of claim 1 in which titanium trichloride is ground with from 0.05 up to 0.50 moles of hexamethylphosphoric triamide and from 0.05 up to 0.50 moles of titanium tetrachloride for each mole of the titanium trichloride.

6. The process of claim 1 in which titanium trichloride is ground with from 0.05 up to 0.70 moles of 2-dimethylamino-1,3-dimethyl-1,3,2-diazaphospholidine-2-oxide and from 0.01 up to 0.50 moles of titanium tetrachloride for each mole of the titanium trichloride.

7. The process of claim 1 in which titanium trichloride is ground with from 0.05 up to 0.50 moles of N,N,N',N',N''-pentamethyl-N''-β-dimethylamino-ethylphosphoric triamide and from 0.05 up to 0.60 moles of titanium tetrachloride for each mole of the titanium trichloride.

8. The process of claim 5 wherein grinding is effected by milling at a temperature in the range from 10° up to 40° C.

9. The process of claim 1 wherein the organic Lewis Base compound is 2-dimethylamino-1,3-dimethyl-1,3,2-diazaphospholidine-2-oxide or N,N,N',N',N''-pentamethyl-N''-β-dimethylaminoethylphosphoric triamide and grinding is effected by milling at a temperature in the range from 0° up to 30° C.

10. The process of claim 1 wherein the organic Lewis Base compound is N,N,N',N',-tetramethylethyl phosphorodiamidate and grinding is effected by milling at a temperature in the range from −10° up to +10° C.

11. The process of claim 1 in which at least a part of the organic Lewis Base compound and at least a part of the titanium tetrahalide which are ground with the titanium trihalide are added as a complex between the organic Lewis Base compound and the titanium tetrahalide.

12. In an olefine polymerisation catalyst comprising
(1) a titanium trihalide; and
(2) at least one organo-metallic compound of aluminium or of a non-transition metal of Group IIA of the Periodic System, or a complex of an organo-metal compound of a non-transition metal of Group IA or IIA of the Periodic System and an organo-aluminium compound,
the improvement which comprises using as component (1) a titanium trihalide produced by the process of claim 1.

13. The catalyst of claim 1 which also includes an organo-Lewis Base compound which is a hydrocarbyl amine, alkanolamine or a compound containing at least one phosphorous atom selected from the group consisting of hexamethylphosphoric triamide, N,N,N',N'-tetramethylethyl phosphorodiamidate; N,N,N',N',N''-pentamethyl-N''-β-dimethylamino-ethylphosphoric triamide; 2-dimethylamino-1,3-dimethyl-1,3,2-diazaphospholidine-2-oxide octamethylpyrophosphoramide, hydrocarbyl phosphines, hydrocarbyl phosphine oxides, hydrocarbyl phosphites, and hydrocarbyl phosphates.

14. The catalyst of claim 12 which also includes a substituted or unsubstituted polyene which is selected from the group consisting of 3-methylheptatriene (1,4,6), cyclooctatriene, cyclooctatetraene, cycloheptatriene, alkyl- or alkoxy-substituted derivatives thereof, tropylium salts, tropylium complexes, tropolone and tropone.

15. The catalyst of claim 12 which contains at least 0.05 and up to 50 molecular proportions of component 2 for each molecular proportions of titanium trihalide which is component (1).

16. The catalyst of claim 13 which contains from 0.01 up to 10 molecular proportions of the organo-Lewis Base compound which is component (3) for each molecular proportion of titanium trihalide which is present as component (1), and the number of molecular proportions of component (3) is less than the number of molecular proportions of component (2).

17. The catalyst of claim 14 which contains from 0.01 up to 1.0 molecular proportions of the substituted or unsubstituted polyene for each molecular proportion of component (2).

* * * * *

UNITED STATES PATENT OFFICE
CERTIFICATE OF CORRECTION

Patent No. 4,108,796      Dated August 22, 1978

Inventor(s) Anthony David Caunt, Michael Stanley Fortuin, Ian Gabriel Williams

It is certified that error appears in the above-identified patent and that said Letters Patent are hereby corrected as shown below:

Claim 13, at column 20, line 37 please change "1" to read --12--, and after "includes" please insert --(3)--.

Signed and Sealed this

Twenty-eighth Day of August 1979

[SEAL]

Attest:

LUTRELLE F. PARKER
*Attesting Officer*     *Acting Commissioner of Patents and Trademarks*